June 2, 1925.

R. E. HELLMUND

INDUCTION MOTOR CONTROL SYSTEM

Filed March 23, 1920

1,539,839

WITNESSES:
J. A. Helsel.
Wm. C. McCoy.

INVENTOR
Rudolf E. Hellmund
BY
Wesley G. Carr
ATTORNEY

Patented June 2, 1925.

1,539,839

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

INDUCTION-MOTOR-CONTROL SYSTEM.

Application filed March 23, 1920. Serial No. 367,995.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Induction-Motor-Control Systems, of which the following is a specification.

My invention relates to control systems for induction motors and it particularly relates to systems for effecting the dynamic braking of induction motors by applying direct-current excitation to the primary windings of the motor.

One object of my invention is to so control the excitation of the field magnet of the motor that uniform braking action may be obtained.

Another object of my invention is to automatically control the rate of deceleration of the motor in such manner that uniformly varying braking may be obtained by means independent of the master switch.

A further object of my invention is to automatically maintain a predetermined relation between the value of the primary exciting current and the value of the secondary current of induction motors during the period of braking.

According to my invention, I provide a system which differs from the usual system for effecting the dynamic braking of induction motors in that I provide an additional means for automatically adjusting and changing the braking effect produced by the application of direct-current excitation to the primary windings of the motor.

Figure 1:
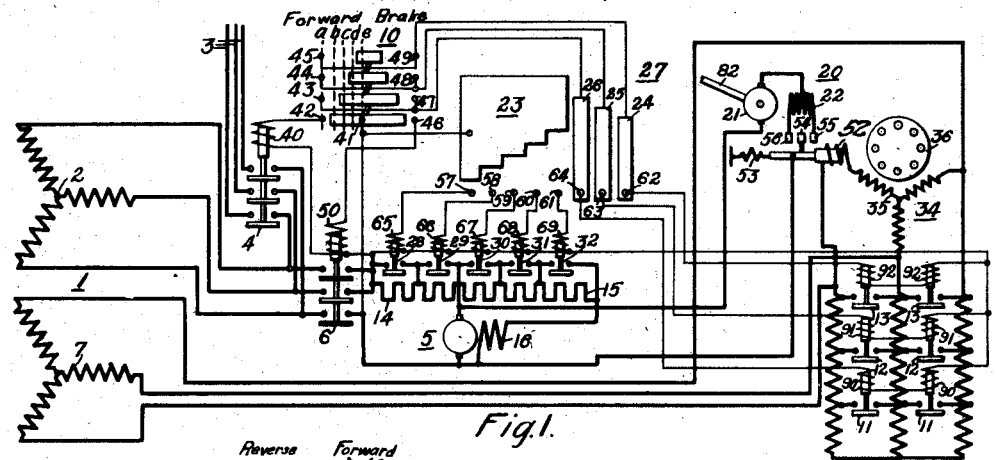
Figure 2:
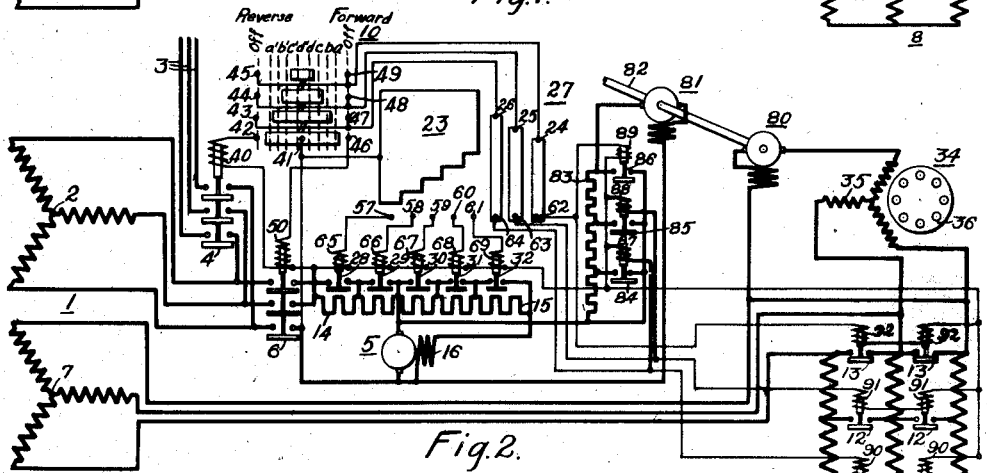
Figure 3:
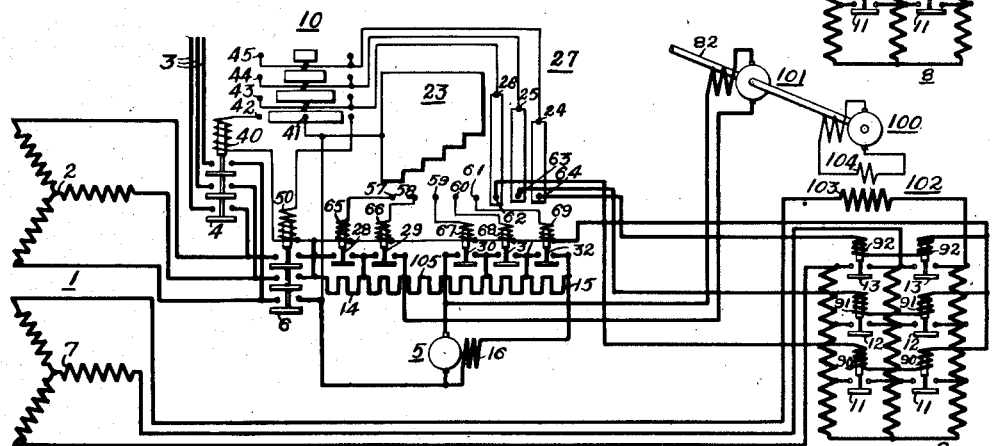

Fig. 1 of the accompanying drawing is a diagrammatic view of a control system embodying my invention; and Figs. 2 and 3 are modifications of the system illustrated in Fig. 1.

The control system illustrated in Fig. 1 comprises an induction motor 1 that has a primary winding 2, which may be energized from any suitable source of polyphase current 3 through a line switch 4, or from a source of direct-current, that is herein indicated by a direct-current generator 5, through switch 6. The motor 1 has a secondary winding 7 and an accelerating resistor 8 that is included in the circuit of the winding for controlling the acceleration and deceleration of the motor.

The forward operation of the motor and the establishment of braking circuits therefor are controlled by means of a master switch 10 which controls the operation of the line switch 4 for forward operation, the auxiliary line switch 6 for dynamic-braking conditions and the accelerating switches 11, 12 and 13 for controlling the acceleration of the motor 1.

The degree of excitation of the primary winding 2 by current from the generator 5 is controlled by a resistor 14 that is included in the main circuit of the generator 5 and a field rheostat 15 that is included in the circuit of the field-magnet winding 16 of the generator 5. A pilot motor 20, which has an armature 21 and a field-magnet winding 22, controls contact segments 23 to 26, inclusive, of a switch 27 for automatically adjusting the degree of excitation of the primary winding 2 from the direct-current generator 5 by closing certain of the control switches 28 to 32, inclusive.

The operation of the pilot motor 20, or a suitable relay performing like functions, is controlled by the current supplied to an inductive device, herein indicated as a squirrel-cage motor 34, which embodies a primary winding 35 and an armature winding 36. Although a squirrel-cage motor is herein shown, it should be understood that any suitable form of inductive device may be employed.

Further details of the system and the sequence of operation of the various switches and associated apparatus will hereinafter be described in connection with the operation of the system.

In order to operate the system shown in Fig. 1, the master switch 10 is moved to its first forward operating position *b* to energize an actuating coil 40 of the switch 4 by a circuit that extends from the positive side to the negative side of the direct-current generator 5 through the contact segment 41 of the master switch 10, contact finger 42 and actuating coil 40. The closing of switch 4 connects the primary winding 2 of the induction motor to the source 3 of alternating current to effect the operation of the motor 1.

The speed of operation of the motor 1 is controlled, in the usual manner, by moving the master switch 10 successively, through positions c, d, and e, to engage contact fingers 43 to 45, inclusive, to successively close pairs of accelerating switches 11, 12 and 13 in the usual manner that is familiar to those skilled in the art. The switches 11, 12 and 13 may also be controlled automatically, in any of the well known systems of acceleration, for forward or braking operations.

If it is desired to establish braking-circuit conditions, the master switch 10 is first returned to its "off" or coasting position, which is designated a in the drawing, and is then moved in the reverse direction to successively engage contact fingers 46 to 49, inclusive, in the order named.

When the positively energized contact segment 41 engages contact finger 46, a circuit is completed from contact finger 46 through an actuating coil 50 of the auxiliary line switch 6 to the negative side of the generator 5. The switch 6 closes to connect the generator 5 to the primary winding 2 of the induction motor through an interposed resistor 14 that is controlled by means of switches 28 and 29. The voltage of the direct-current generator 5 is also regulated by means of the field rheostat 15 and the associated switches 30, 31 and 32.

The contact fingers 47, 48 and 49 respectively complete circuits including contact segments 24 to 26, inclusive, for effecting the actuation of pairs of accelerating switches 11, 12 and 13, in a manner similar to that described for forward operation of the motor.

If the primary field-magnet winding of an induction motor is excited from a source of direct-current, the amplitude of the current traversing the secondary winding of the motor is dependent upon the speed of operation of the motor, the resistance and inductance of the motor winding, and the degree of saturation of the motor field magnet. It will, therefore, be understood that it is possible to obtain very heavy induced damping currents in the secondary winding by reason of relatively high motor speed and relatively small secondary resistance, but such currents produce only small braking torque because the resultant field flux is rendered relatively small by their damping action. This condition, it will be seen, creates undue heating in the motor windings and provides small braking action.

Another difficulty arises when the motor speed is relatively small and when the direct-current-excited source is adjusted for large values of excitation. When these conditions exist, the resultant field may be dangerously strong and, in some cases, may cause deflections of the motor shaft or other dangerous results from unbalanced magnetic pulls in the machine. This may also give rise to dangerously high secondary voltages and other undesirable conditions.

In order to avoid these undesirable conditions, I employ a translating device which may be either an induction motor that is designed for a large magnetizing current and a small load current, or an inductive device, as a means for controlling the excitation of the primary winding by the generator 5 during dynamic braking.

The control of the excitation of the primary winding by means of an inductive device is based upon the principle that the excitation of the motor field magnet is approximately constant during braking so long as the ratio of secondary frequency to secondary voltage is maintained constant. It is further based on the fact that, if an inductive device is connected across a source of alternating current, the magnetizing current traversing such device is approximately constant for a given ratio of voltage to frequency of alternations in the circuit to which the inductive device is connected. If the ratio of voltage to frequency increases, the magnetizing current supplied to the induction device increases.

The change of current supplied to the induction motor 34 is utilized to control the operation of a relay or a pilot motor 20 to regulate the degree of excitation that is impressed on the primary winding of the main induction motor 1 during braking.

If the ratio of voltage to frequency of alternations in the circuit of the primary motor winding decreases, the current traversing the circuit of the induction motor 34 decreases and this change in current is employed to increase the excitation of the primary winding 2 by changing the voltage that is supplied to the winding from the generator 5.

The current traversing the windings of the auxiliary induction motor 34 also traverses an actuating coil 52 that opposes the operation of a spring 53 to control the operation of a contact member 54 in such manner that, when the current traversing the coil 52 exceeds a predetermined value, the contact member 54 engages contact member 55 to energize the field-magnet winding 22 of the pilot motor 20 in one direction whereas, if the current traversing the winding 52 decreases to less than a predetermined value, the contact member 54 engages contact member 56 to energize the field-magnet winding 22 of the pilot motor 20 in a reverse direction relative to the armature 21 to reverse the direction of operation of the pilot motor 20.

The pilot motor 20 is employed to actuate the contact segments 23 to 26, inclusive, into and out of engagement with a series of contact fingers 57 to 64, inclusive. The contact segments 23 to 26, inclusive, are mechanically connected together and are insulated from one another. When the magnetizing current supplied to the inductive device 34 is less than the predetermined value hereinbefore mentioned, the pilot motor 20 operates to advance the contact segment 23 to engagement with co-operating contact fingers 57 to 61, inclusive, to successively energize actuating coils 65 and 66 of switches 28 and 29 that bridge the resistor 14 in the main circuit of the generator 5, and actuating coils 67, 68 and 69 of switches 30, 31 and 32 for gradually shunting the field rheostat 45 to increase the excitation of the generator 5 and thereby impress greater excitation upon the primary winding 2 of the induction motor 1.

If the current traversing the secondary winding 7 of the motor 1 increases to such value that the closing of switches 28 to 32, inclusive, does not reduce the current to a sufficiently low value, the continued operation of the pilot motor 20 effects the disengagement of contact segments 24, 25 and 26, in the order named, from the co-operating contact fingers 62, 63 and 64 to successively open switches 13, 12 and 11. This re-inserts the resistor 8 in the circuit of the secondary winding 7 to reduce the value of current traversing the secondary winding to a safe value.

Like symbols of reference are employed in the several figures of the drawing to designate like apparatus.

The control system illustrated in Fig. 2 of the drawings embodies a pair of opposed torque motors 80 and 81 that are respectively energized by the current traversing the auxiliary induction motor 34 and by the voltage of the armature of the generator 5. The torque motor 80 will, in this instance, develop a torque that is proportional to the current traversing the circuit of the auxiliary induction motor 34. The torque of the motor 81 opposes the torque of motor 80 to rotate the shaft 82 that controls the switch 27 in such manner that the switch is moved to engagement with the contact fingers 57 to 61, inclusive, when the torque from the motor 80 predominates, and the contact segment 23 is moved to disengage the cooperating contact fingers when the torque from motor 81 exceeds that of motor 80.

By providing a resistor 83 that is included in the circuit of the torque motor 81, the torque of the motor 81 can be varied to any desired degree. In this particular instance, the resistor 83 is inserted or excluded from the circuit of the torque motor 81 by means of a series of switches 84, 85 and 86.

The actuating coils 87, 88 and 89 of the respective switches 84, 85 and 86 are respectively connected in shunt with the actuating coils 90, 91 and 92 of the switches 11, 12 and 13 in such manner that the respective pairs of switches 11 and 84, 12 and 85, and 13 and 86 operate simultaneously.

By varying the effective portion of the resistor 83 in the circuit of the torque motor 81, the torque of the motor may be automatically altered to any desired degree. By adjusting the resistor 83 simultaneously with the adjustment of the resistor 8, the operating field strength of the main motor may be changed in accordance with the changed circuit relations of the motor 81. Since it is often desirable to obtain a stronger braking field at lower speeds of the main induction motor, this result is effected by employing the system shown in Fig. 2.

Instead of regulating the field-flux intensity of the motor 1 by apparatus that is responsive to the ratio of voltage to frequency of alternations of the current traversing the secondary winding of the motor, it is possible to obtain a desirable field strength by maintaining a constant difference between the currents traversing the primary and the secondary circuits. While this condition does not take in to account the phase relation of the two circuits, in the majority of cases, it effects sufficiently close regulation.

Fig. 3 of the drawing illustrates a pair of opposed torque motors 100 and 101 that respectively develop torques substantially proportional to the currents traversing the primary and secondary windings of the induction motor. By interposing a current transformer 102, which has a primary winding 103 and a secondary winding 104, in the circuit of the secondary winding 7 of the main motor, a current is supplied to the torque motor 100 which is proportional to the current traversing the secondary winding of the induction motor 1.

A resistor 105, which, for convenience, is shown as interposed between resistors 14 and 15, is included in the circuit of the primary winding and is employed to supply energy to the torque motor 101 that is proportional to changes of current traversing the primary winding 2 of the main induction motor 1. By this method of connecting the torque motors 100 and 101, their torques are opposed and are adjusted in such manner that a substantially constant difference of current is maintained in the two circuits by the operation of contact segments 23 to 26, inclusive, by the two torque motors to maintain the opposing torques substantially equal. It is generally desirable, when employing opposing torque motors such as 100 and 101, to maintain the same degree of energization in the two motors, but, at times, such, for instance, as when a greater braking effort is desired at one speed than at another speed of operation, one of the torque motors may be operated at a higher degree of magnetic saturation than the other. In this manner, an increasing or a decreasing difference in the value of two currents may be automatically maintained throughout the range of operation of the motors.

Obviously, I do not wish to be restricted to the specific details and relationship of parts shown and described in this application, since it is evident that the benefits of my invention may be secured by employing various other devices that differ to a greater or less degree from the devices herein described, without departing from the spirit and scope of my invention. I desire, therefore, that only such limitations shall be imposed as are indicated in the appended claims.

I claim as my invention:

1. In a control system, the combination with an induction motor having a primary and a secondary winding, a source of direct current connected to said primary winding, and means for maintaining a predetermined ratio of voltage of said direct current to frequency of alternations in said secondary winding.

2. In a control system, the combination with an induction motor having a primary an a secondary winding, and a source of direct current connected to the primary winding of said induction motor, of means for automatically maintaining a predetermined ratio of voltage applied to said primary winding to frequency of alternations in said secondary winding for a plurality of materially differing speeds of operation of said motor.

3. In a control system, the combination with an induction motor having a primary and a secondary winding, and a source of direct current connected to the primary winding of said induction motor, of means for automatically maintaining a predetermined relation between the values of the currents traversing the primary and the secondary windings of said induction motor for a plurality of speeds.

4. In a control system, the combination with an induction motor having a primary and a secondary winding, and a source of direct current for effecting the dynamic braking of said motor, of an inductive device included in the circuit of said secondary winding, and a device responsive to the current traversing the circuit of said inductive device for adjusting the energization of said primary winding during dynamic braking of said motor.

5. In a control system, the combination with an induction motor having a primary and a secondary winding, a resistor in circuit with said secondary winding and a source of direct current, of means for connecting said source to said primary winding to effect dynamic braking of said motor, a controller for varying the effect of said source and an auxiliary induction motor associated with said resistor for effecting operation of said controller.

In testimony whereof I have hereunto subscribed my name this 5th day of March, 1920.

RUDOLF E. HELLMUND.